United States Patent
Thomas (10) Patent No.: US 12,169,102 B2
(45) Date of Patent: Dec. 17, 2024

(54) PLUMBING WITH INTERNAL FLOW GUIDES

(71) Applicant: RAYTHEON TECHNOLOGIES CORPORATION, Farmington, CT (US)

(72) Inventor: Michael R. Thomas, South Windsor, CT (US)

(73) Assignee: RTX CORPORATION, Farmington, CT (US)

(*) Notice: Subject to any disclaimer, the term of this patent is extended or adjusted under 35 U.S.C. 154(b) by 239 days.

(21) Appl. No.: 17/748,844

(22) Filed: May 19, 2022

(65) Prior Publication Data

US 2022/0275758 A1    Sep. 1, 2022

Related U.S. Application Data

(62) Division of application No. 16/857,055, filed on Apr. 23, 2020, now Pat. No. 11,365,681.

(51) Int. Cl.
*F28D 7/16* (2006.01)
*F02C 7/14* (2006.01)
(Continued)

(52) U.S. Cl.
CPC .............. *F28D 7/1615* (2013.01); *F02C 7/14* (2013.01); *F02C 7/18* (2013.01); *F16L 41/00* (2013.01); *F16L 53/70* (2018.01); *F28D 1/0233* (2013.01); *F28D 7/10* (2013.01); *F28D 7/14* (2013.01); *F05D 2220/32* (2013.01);
(Continued)

(58) Field of Classification Search
CPC . F28D 7/1615; F28D 7/10; F28D 7/14; F28D 1/0233; F28D 2001/0273; F28D 7/0233; F16L 53/70; F16L 41/00; F02C 7/14; F02C 7/18; F28F 2250/06; F28F 2250/106; F28F 2001/0273
See application file for complete search history.

(56) References Cited

U.S. PATENT DOCUMENTS 1,566,528 A * 12/1925 Egloff .................. B01D 5/0012
                                                165/139
3,315,739 A *  4/1967 Kearney ................. F28F 21/02
                                                165/DIG. 396
(Continued)

FOREIGN PATENT DOCUMENTS

EP    0667460    8/1995
EP    1975373    10/2008
(Continued)

OTHER PUBLICATIONS

USPTO; Requirement for Restriction/Election dated Jun. 16, 2021 in U.S. Appl. No. 16/857,055.
(Continued)

*Primary Examiner* — Tho V Duong
(74) *Attorney, Agent, or Firm* — SNELL & WILMER L.L.P.

(57) ABSTRACT

A conduit assembly may comprise: a pipe; a plurality of hollow passages disposed through the pipe; and a plurality of flow guides disposed in the pipe, each flow guide in the plurality of flow guides at least partially defining a respective hollow passage in the plurality of hollow passages. The conduit assembly may act as a heat exchanger.

7 Claims, 7 Drawing Sheets

(51) Int. Cl.
  *F02C 7/18* (2006.01)
  *F16L 41/00* (2006.01)
  *F16L 53/70* (2018.01)
  *F28D 1/02* (2006.01)
  *F28D 7/10* (2006.01)
  *F28D 7/14* (2006.01)
  *F28D 21/00* (2006.01)

(52) U.S. Cl.
  CPC ........ *F05D 2260/213* (2013.01); *F28D 1/024* (2013.01); *F28D 2001/0273* (2013.01); *F28D 2021/0021* (2013.01); *F28D 2021/0026* (2013.01); *F28F 2250/106* (2013.01)

(56) References Cited

U.S. PATENT DOCUMENTS

| | | | |
|---|---|---|---|
| 4,271,110 A * | 6/1981 | Minjolle | B28B 3/20 |
| | | | 264/209.1 |
| 4,787,443 A * | 11/1988 | Fukatsu | F28D 7/0058 |
| | | | 165/181 |
| RE33,013 E * | 8/1989 | Takeuchi | B01J 15/00 |
| | | | 428/116 |
| 5,416,057 A * | 5/1995 | Lipp | F01N 3/2889 |
| | | | 427/230 |
| 5,645,127 A | 7/1997 | Enderle et al. | |
| 6,412,975 B1 * | 7/2002 | Schuchardt | B01F 25/43161 |
| | | | 366/337 |
| 8,061,323 B2 | 11/2011 | Konzelmann et al. | |
| 9,835,380 B2 | 12/2017 | Kupiszewski | |
| 10,260,359 B2 | 4/2019 | Groom et al. | |
| 10,801,790 B2 | 10/2020 | Streeter | |
| 2003/0089491 A1 * | 5/2003 | Mitsumoto | F28D 7/1615 |
| | | | 165/157 |
| 2008/0230651 A1 | 9/2008 | Porte | |
| 2010/0146953 A1 * | 6/2010 | Bhatti | F28D 7/1615 |
| | | | 60/320 |
| 2015/0083375 A1 * | 3/2015 | Heusser | F28F 13/125 |
| | | | 29/890.03 |
| 2016/0265850 A1 * | 9/2016 | Kupiszewski | F28D 1/0233 |
| 2017/0198988 A1 | 7/2017 | Herring | |
| 2017/0284343 A1 * | 10/2017 | Nitta | F28D 1/06 |
| 2018/0283794 A1 | 10/2018 | Cemy | |
| 2019/0113283 A1 * | 4/2019 | Koga | F28F 7/02 |

FOREIGN PATENT DOCUMENTS

| | | |
|---|---|---|
| EP | 2492628 | 8/2012 |
| EP | 3012437 | 4/2016 |
| JP | H11311131 | 11/1999 |

OTHER PUBLICATIONS

European Patent Office, European Search Report dated Sep. 17, 2021 in Application No. 21169711.5.

USPTO; Non-Final Office Action dated Sep. 27, 2021 in U.S. Appl. No. 16/857,055.

USPTO; Notice of Allowance dated Mar. 4, 2022 in U.S. Appl. No. 16/857,055.

European Patent Office, European Office Action dated Nov. 20, 2023 in Application No. 21169711.5.

* cited by examiner

PLUMBING WITH INTERNAL FLOW GUIDES

CROSS-REFERENCE TO RELATED APPLICATIONS

This application is a divisional of, and claims priority to, and the benefit of Non-Provisional application Ser. No. 16/857,055, filed Apr. 23, 2020 entitled PLUMBING WITH INTERNAL FLOW GUIDES, which is incorporated in its entirety by reference herein for all purposes.

FIELD

The present disclosure relates to gas turbine engines, and, more specifically, to a plumbing apparatus for a gas turbine engine.

BACKGROUND

A gas turbine engine typically includes a fan section, a compressor section, a combustor section, and a turbine section. In general, during operation, air is pressurized in the fan and compressor sections and is mixed with fuel and burned in the combustor section to generate hot combustion gases. The hot combustion gases flow through the turbine section, which extracts energy from the hot combustion gases to power the compressor section and other gas turbine engine loads.

Gas turbine engines may include various cooling systems that employ heat exchangers. Bypass air may be directed across the heat exchangers as a cooling fluid. The inlet piping of the heat exchanger (i.e., the bypass air exiting the heat exchanger) may partially block and/or adversely heat up an engine bay. The piping may also cause pressure loss that may otherwise be used to drive heat rejection in the heat exchanger.

SUMMARY

A conduit assembly is disclosed herein. The conduit assembly may comprise: a pipe; a plurality of hollow passages disposed through the pipe; and a plurality of flow guides disposed in the pipe, each flow guide in the plurality of flow guides at least partially defining a respective hollow passage in the plurality of hollow passages, wherein: the plurality of hollow passages are configured to receive a first fluid, the pipe is configured to receive a second fluid, and the conduit assembly is configured to transfer heat from the first fluid to the second fluid.

In various embodiments, the pipe may include a curved pipe portion having an inner radius portion and an outer radius portion, the plurality of flow guides disposed between the outer radius portion and the inner radius portion. Each flow guide in the plurality of flow guides may comprise a radially inner wall and a radially outer wall. The radially inner wall and the radially outer wall may at least partially define a respective hollow passage in the plurality of hollow passages. The pipe may be a straight pipe portion. The pipe may include a trip strip on a heat transfer surface. Each flow guide in the plurality of flow guides may be configured to guide the first fluid.

A conduit assembly is disclosed herein. The conduit assembly may comprise: a pipe portion configured to receive a first fluid, the pipe portion including a trip strip on a heat transfer surface; and a plurality of hollow passages disposed through the pipe portion, the plurality of hollow passages configured to receive a second fluid.

In various embodiments, the conduit assembly may further comprise a plurality of flow guides disposed in the pipe portion, each flow guide in the plurality of flow guides configured to guide the first fluid. Each flow guide in the plurality of flow guides may at least partially define a respective hollow passage in the plurality of hollow passages. The pipe portion may be a curved pipe portion having an inner radius portion and an outer radius portion, the plurality of flow guides disposed between the outer radius portion and the inner radius portion. Each flow guide in the plurality of flow guides may comprise a radially inner wall and a radially outer wall. The radially inner wall and the radially outer wall may at least partially define a respective hollow passage in the plurality of hollow passages. The pipe portion may be a straight pipe portion.

A gas turbine engine is disclosed herein. The gas turbine engine may comprise: an outer engine case structure; an inner engine case structure disposed radially inward from the outer engine case structure, the outer engine case structure and the inner engine case structure defining a bypass duct configured to receive an airflow; a conduit assembly at least partially disposed in the bypass duct, the conduit assembly comprise a pipe and a plurality of hollow passages disposed through the pipe, the conduit assembly configured to receive a fluid, the plurality of hollow passages configured to receive the airflow.

In various embodiments, the gas turbine engine may further comprise a heat exchanger in fluid communication with the conduit assembly. The gas turbine engine may further comprise a plurality of flow guides disposed in the pipe, each flow guide in the plurality of flow guides configured to guide the fluid. The pipe may include a curved pipe portion having an inner radius portion and an outer radius portion, the plurality of flow guides disposed between the outer radius portion and the inner radius portion. Each flow guide in the plurality of flow guides may comprises a radially inner wall and a radially outer wall. The radially inner wall and the radially outer wall may at least partially define a respective hollow passage in the plurality of hollow passages.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface cross hatching lines may be used throughout the figures to denote different parts but not necessarily to denote the same or different materials.

Throughout the present disclosure, like reference numbers denote like elements. Accordingly, elements with like element numbering may be shown in the figures, but may not necessarily be repeated herein for the sake of clarity.

As used herein, "aft" refers to the direction associated with the tail (e.g., the back end) of an aircraft, or generally, to the direction of exhaust of a gas turbine engine.

A first component that is "radially outward" of a second component means that the first component is positioned at a greater distance away from a central longitudinal axis of the gas turbine engine. A first component that is "radially inward" of a second component means that the first component is positioned closer to the engine central longitudinal axis than the second component. The terminology "radially outward" and "radially inward" may also be used relative to reference axes other than the engine central longitudinal axis.

Figure 1:
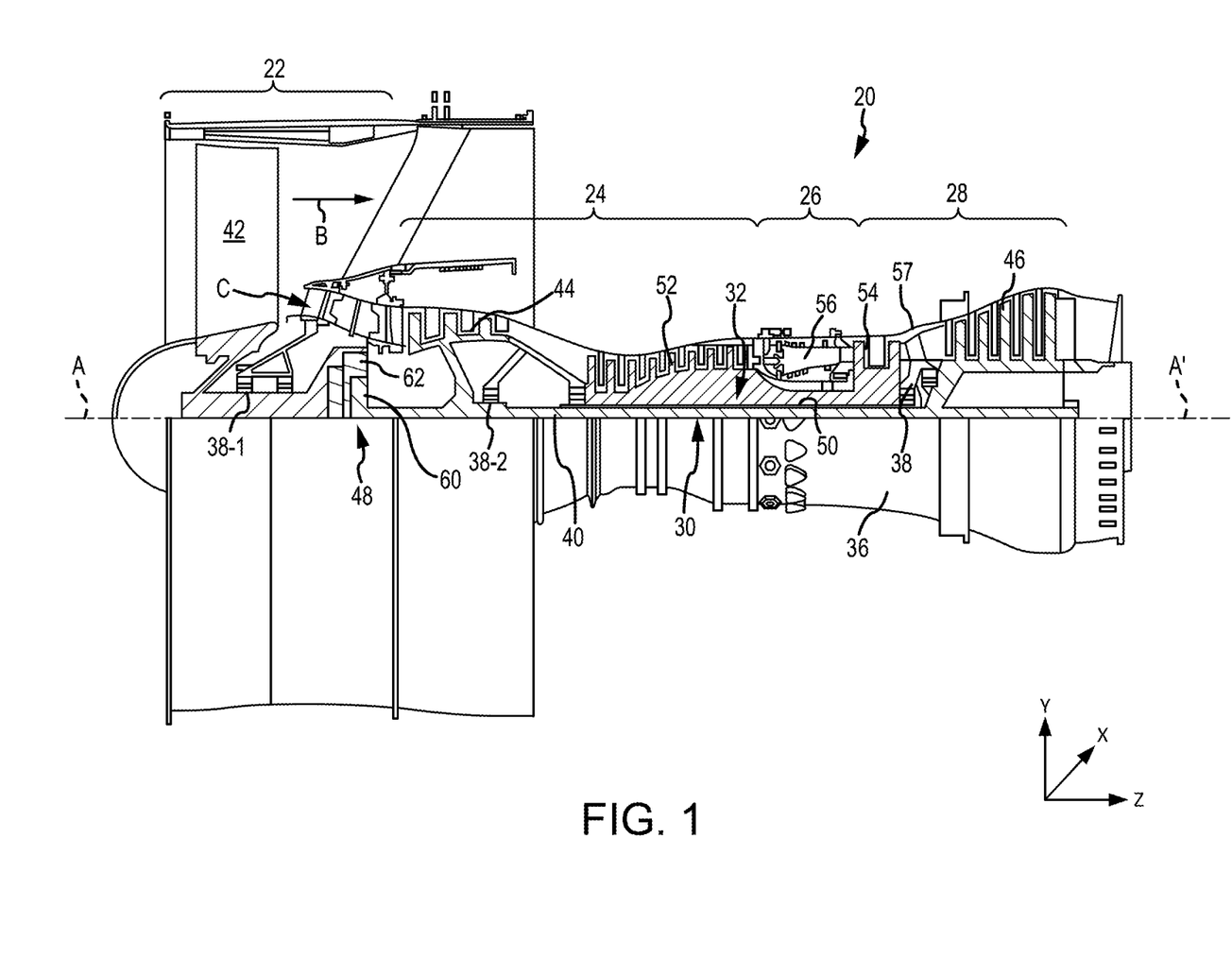
FIG. 1 illustrates a cross-sectional view of an exemplary gas turbine engine, in accordance with various embodiments.

In various embodiments and with reference to FIG. 1, a gas turbine engine 20 is provided. Gas turbine engine 20 may generally include a fan section 22, a compressor section 24, a combustor section 26, and a turbine section 28. In operation, fan section 22 drives fluid (e.g., air) along a bypass flow-path B, while compressor section 24 drives fluid along a core flow-path C for compression and communication into combustor section 26 and then expansion through turbine section 28. Although gas turbine engine 20 is depicted as a turbofan gas turbine engine herein, it should be understood that the concepts described herein are not limited to use with turbofans as the teachings may be applied to other types of turbine engines.

Gas turbine engine 20 may generally comprise a low speed spool 30 and a high speed spool 32 mounted concentrically, via bearing systems 38, for rotation about for rotation about engine central longitudinal axis A-A' and relative to an engine static structure 36. It should be understood that various bearing systems 38 at various locations may alternatively or additionally be provided, including for example, bearing system 38, bearing system 38-1, and bearing system 38-2. Engine central longitudinal axis A-A' is oriented in the z direction on the provided xyz axes. The z direction on the provided xyz axes refers to the axial direction. As used herein, the term "radially" refers to directions towards and away from engine central longitudinal axis A-A' and the z-axis. As used herein, the terms "circumferential" and "circumferentially" refer to directions about central longitudinal axis A-A' and the z-axis.

Low speed spool 30 may generally comprise an inner shaft 40 that interconnects a fan 42, a low pressure compressor 44, and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54. A combustor 56 may be located between high pressure compressor 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about engine central longitudinal axis A-A', which is collinear with their longitudinal axes. As used herein, a "high pressure" compressor or turbine experiences a higher pressure than a corresponding "low pressure" compressor or turbine. The airflow in core flow-path C may be compressed by low pressure compressor 44 and high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion.

The compressor section 24, the combustor section 26, and the turbine section 28 are generally referred to as the engine core. Air is drawn into gas turbine engine 20 through fan 42. Air exiting fan 42 may be divided between core flow-path C and bypass flow-path B. The airflow in bypass flow-path B may be utilized for multiple purposes including, for example, cooling and pressurization.

Figure 2A:
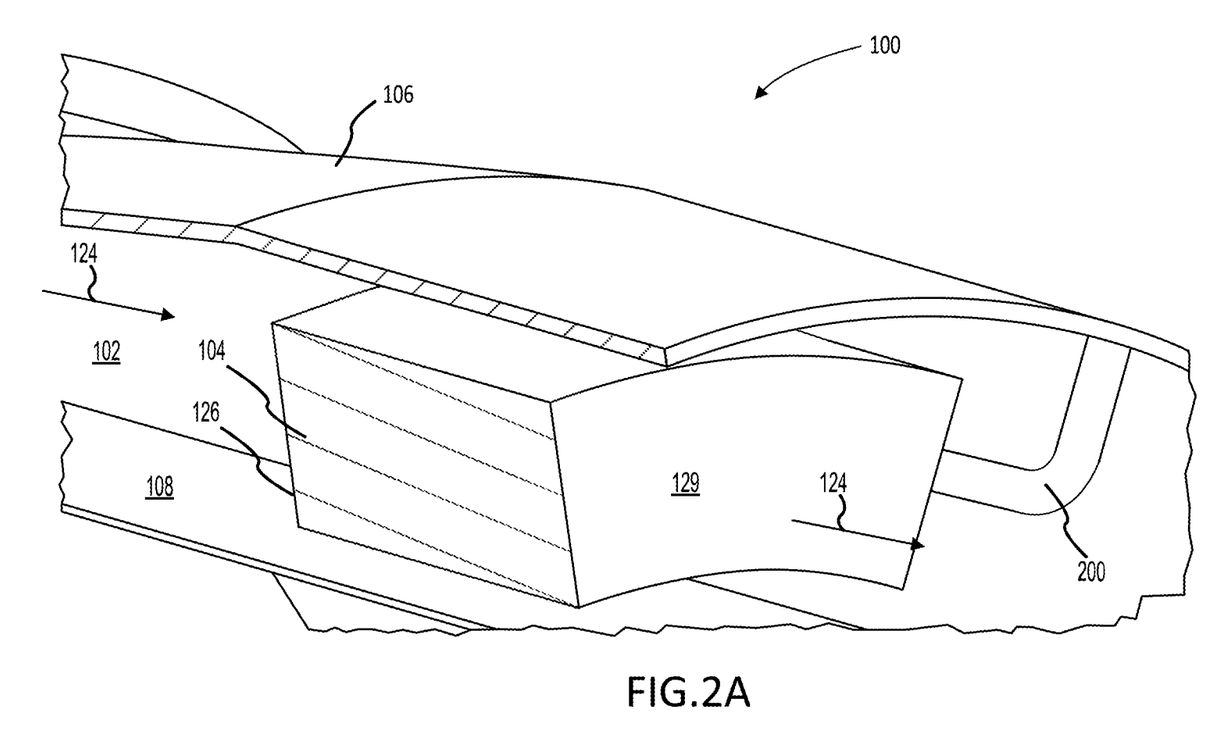
FIG. 2A illustrates a perspective view of a cooling system having a conduit assembly, in accordance with various embodiments.

Referring to FIG. 2A, and with continued reference to FIG. 1, a cooling system 100 having a conduit assembly 200 is illustrated, in accordance with various embodiments. Cooling system 100 includes one or more heat exchanger(s) 104. Heat exchanger(s) 104 may be located between an outer engine case structure 106 and an inner engine case structure 108. Outer engine case structure 106 is radially outward of inner engine case structure 108. Outer engine case structure 106 and inner engine case structure 108 may define a generally annular bypass duct 102 around the engine core. In various embodiments, inner engine case structure 108 may form a portion of engine static structure 36. In various embodiments, air discharged from, for example, fan section 22 may be communicated through the bypass duct 102.

Heat exchanger 104 and conduit assembly 200 are configured to receive a cooling airflow, for example, airflow 124. In various embodiments, airflow 124 may be a portion of the bypass airflow in bypass duct 102. Cooling airflow 124 may be directed across heat exchanger 104 to cool the air in heat exchanger 104 and/or conduit assembly 200. Airflow 124 flows across and/or through heat exchanger 104 to cool the air provided by inlet conduit 112. Airflow 124 is then output from an exhaust output 129 of heat exchanger 104. Stated differently, heat exchanger 104 receives airflow 124 (i.e., a portion of the airflow in bypass duct 102) at cooling flow input 126 and outputs airflow 124 at exhaust output 129. Similarly, airflow 124 flows through a portion of conduit assembly 200, as described further herein.

Figure 2B:
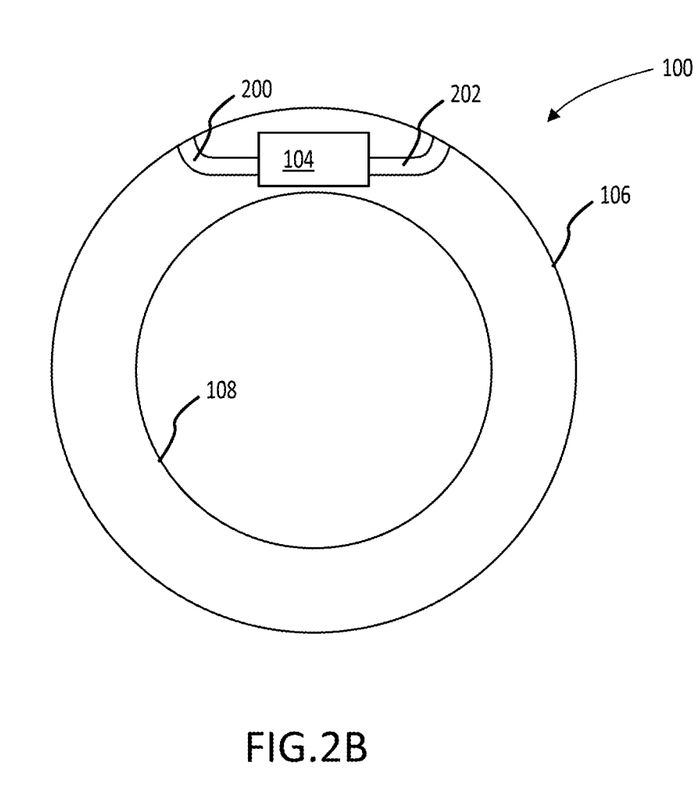
FIG. 2B illustrates a cross-sectional view of a cooling system having a conduit assembly, in accordance with various embodiments.

Referring now to FIG. 2B, an axial cross-sectional view of cooling system 100 is illustrated, in accordance with various embodiments. In various embodiments, the cooling system further comprises a conduit assembly 202. In various embodiments, conduit assembly 200 may be an inlet conduit and conduit assembly 202 may be an outlet conduit. In this regard, relatively hot air may be routed from compressor section 24, travel through the inlet conduit (e.g., conduit assembly 200), through the heat exchanger 104, through the outlet conduit (e.g., conduit assembly 202) and routed to a stage in the turbine section 28.

Figure 3:
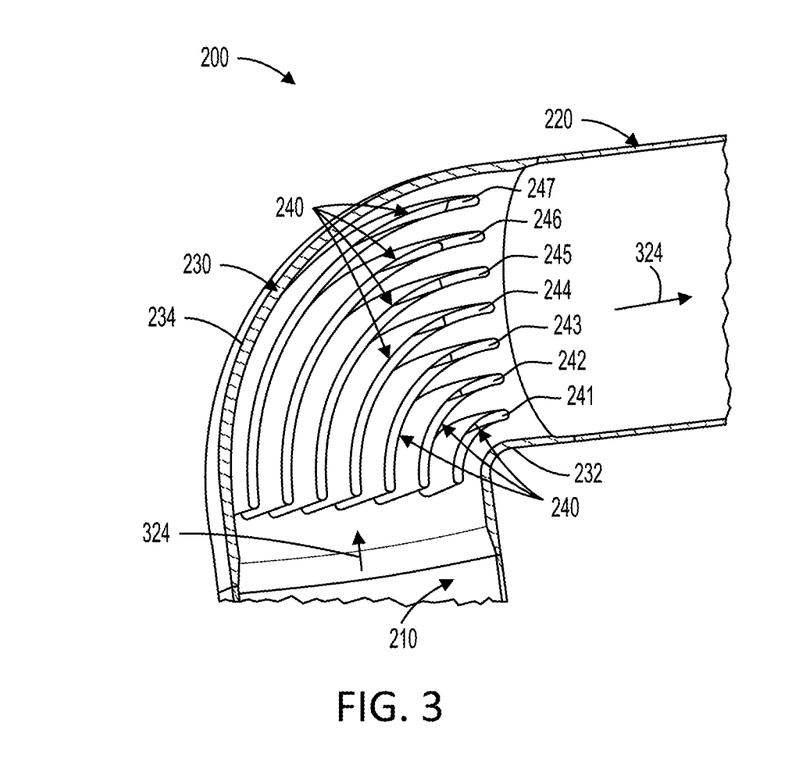
FIG. 3 illustrates a cross-section of a perspective view of a conduit assembly, in accordance with various embodiments.

Referring to FIG. 3, a cross-sectional view of a conduit assembly 200 is illustrated, in accordance with various embodiments. In various embodiments, conduit assembly 202 from FIG. 2B may be in accordance with conduit assembly 200. In various embodiments, the conduit assembly comprises a first straight pipe portion 210, a second straight pipe portion 220 and a curved pipe portion 230 disposed between first straight pipe portion 210 and second straight pipe portion 220. In various embodiments, the curved pipe portion 230 comprises a plurality of flow guides 240. Each flow guide in the plurality of flow guides 240 may extend from a first side of the flow guide to a second side of the flow guide. In this regard, a hollow portion of each flow guide may be configured to receive an airflow, such as airflow 124 form a bypass duct as shown in FIGS. 2A and 2B.

In various embodiments, curved pipe portion 230 comprises an inner radius curve portion 232 disposed opposite an outer radius curve portion 234. The plurality of flow guides 240 may be disposed between the inner radius curve portion 232 and the outer radius curve portion 234. For example, a first flow guide 241 may be disposed radially outward from inner radius curve portion 232. First flow guide 241 may comprise a radius of curvature that is greater than a radius of curvature of the inner radius curve portion 232. In various embodiments, a second flow guide 242 may be disposed radially outward from first flow guide 241. A third flow guide 243 may be disposed radially outward from second flow guide 242, a fourth flow guide 244 may be disposed radially outward from third flow guide 243, a fifth flow guide 245 may be disposed radially outward form the fourth flow guide 244, a sixth flow guide 246 may be disposed radially outward from the fifth flow guide 245, and/or a seventh flow guide 247 may be disposed radially outward from the sixth flow guide 246. The seventh flow guide 247 may be disposed radially inward form the outer radius curve portion 234.

In various embodiments, the closer a flow guide is to the outer radius curve portion 234 the greater an arc length of the flow guide. For example, second flow guide 242 may have a greater arc length than the first flow guide 241, the third flow guide 243 may have a greater arc length than the second flow guide 242, etc. Each flow guide in the plurality of flow guides may comprises a radially inner wall and a radially outer wall.

In various embodiments, the curved pipe portion 230 may be manufactured using additive manufacturing, casting, or the like. In various embodiments, the first straight pipe portion 210 and the second straight pipe portion 220 may comprise a stock pipe or the like. In various embodiments, the curved pipe portion 230 may be coupled to the first straight pipe portion 210 and the second straight pipe portion by welding, brazing, or the like.

Figure 4:
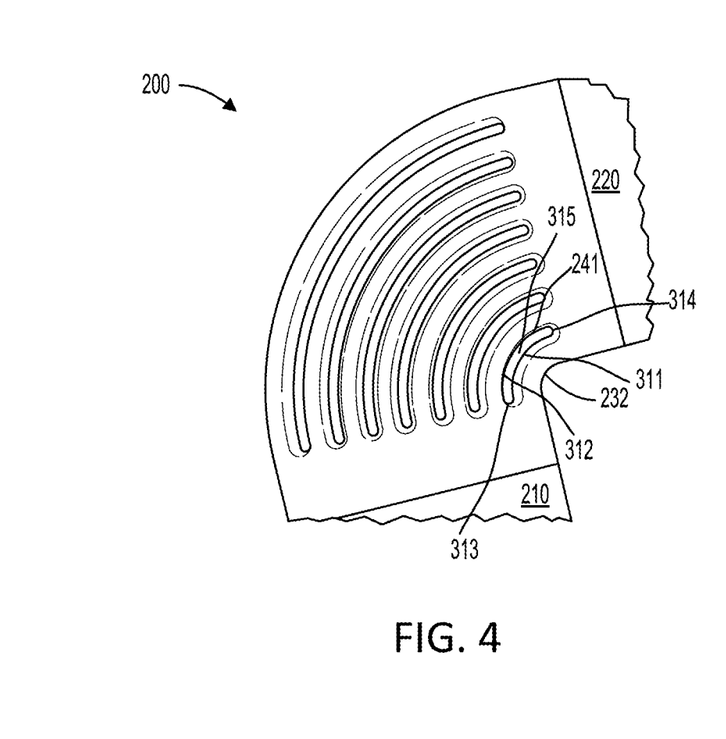
FIG. 4 illustrates a perspective view of a conduit assembly, in accordance with various embodiments.

For example, with reference to FIG. 4, first flow guide 241 may comprise a radially inner wall 311 disposed proximate the inner radius curve portion 232 of the curved pipe portion 230. The first flow guide 241 may further comprise a radially outer wall 312 disposed radially outward from the radially inner wall 311. The radially inner wall 311 may be coupled to the radially outer wall 312 at a first end 313 disposed proximate the first straight pipe portion 210 of the conduit assembly 200. Similarly, the radially inner wall 311 may be coupled to the radially outer wall 312 at a second end 314 disposed proximate the second straight pipe portion 220. In various embodiments the first end 313 and the second end 314 may comprise rounded ends, straight ends, or the like.

In various embodiments, the radially inner wall 311, the radially outer wall 312, the first end 313 and the second end 314 may define a hollow passage 315 therethrough. In various embodiments, the conduit assembly 200 may be configured to receive a first fluid flowing therethrough and the hollow passage 315 may be configured to receive a second fluid flowing therethrough. The first fluid and the second fluid may flow independent of each other. In this regard, with brief reference to FIGS. 2 and 3, in accordance with various embodiments, an airflow 124 in a bypass air duct may flow through the hollow passage 315 of first flow guide 241 and a secondary airflow 324 may flow through conduit assembly 200. In various embodiments, each flow guide in the plurality of flow guides 240 may be in accordance with first flow guide 241.

Figure 5:
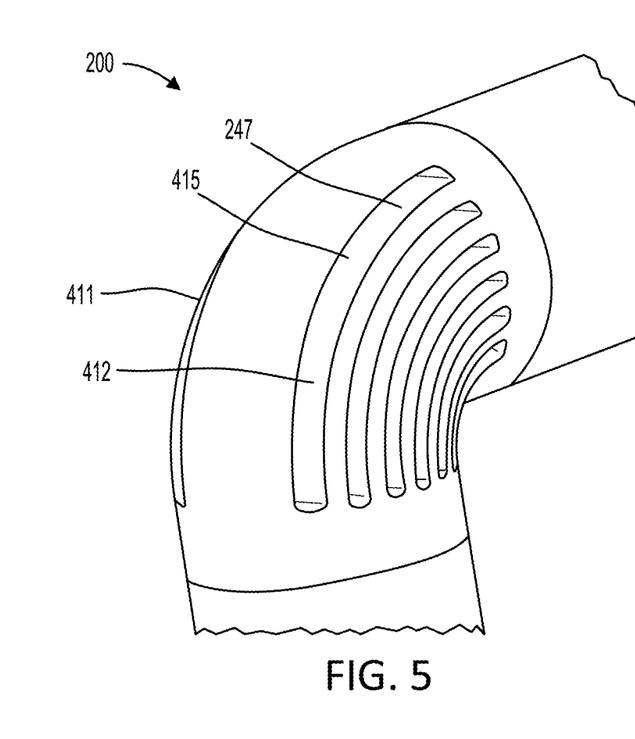
FIG. 5 illustrates a front view of a conduit assembly, in accordance with various embodiments.

In various embodiments, the hollow passages defined by the plurality of flow guides 240 may act as a heat exchanger. Each hollow passageway may comprise an inlet and an outlet. For example, with reference now to FIG. 5, the seventh flow guide 247 may comprise an inlet 411 and an outlet 412. The inlet 411 may be configured to receive an airflow, such as airflow 124 from FIGS. 2A and 2B in a bypass duct 102. Cooling airflow 124 may be directed across the plurality of flow guides 240 to cool the air in conduit assembly 200. Airflow 124 flows across and/or through hollow passageways defined by the plurality of flow guides 240 to cool the air provided by inlet conduit 112 from FIGS. 2A and 2B. Airflow 124 is then output from the outlet 412 of hollow passageway 415 defined by the seventh flow guide 247. Stated differently, conduit assembly 200 receives airflow 124 (i.e., a portion of the airflow in bypass duct 102) at inlet an inlet of each hollow passageway defined by the plurality of flow guides (e.g., hollow passageway 415) and outputs airflow 124 at the outlet of each hollow passageway defined by the plurality of flow guides (e.g., outlet 412).

Figure 6:
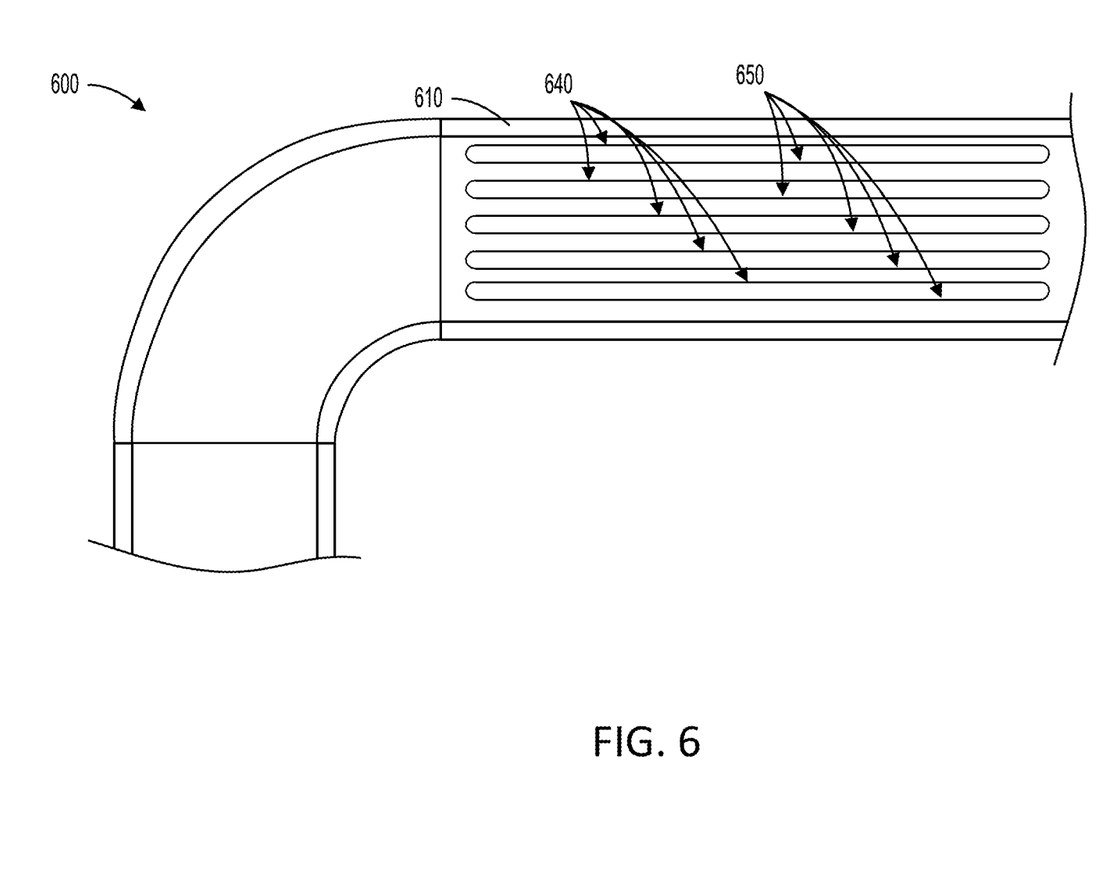
FIG. 6 illustrates a front view of a conduit assembly, in accordance with various embodiments.

Referring now to FIG. 6, conduit assembly 600 in accordance with various embodiments is illustrated. In various embodiments, the plurality of flow guides, as described in FIGS. 3-5 may be disposed in a straight portion of a conduit assembly. For example, conduit assembly 600 comprises a plurality of flow guides 640 disposed in a straight pipe portion 610 of conduit assembly 600. The plurality of flow guides 640 may be in accordance with the plurality of flow guides 240 as described in FIGS. 3-5. In this regard, walls defined by the plurality of flow guides 640 may define a plurality of hollow passages 650 disposed through straight pipe portion 610. In accordance with various embodiments, the conduit assembly 600 may act as a heat exchanger in a similar manner as described with respect to conduit assembly 200. In various embodiments, any combination of straight pipe portion 610 and curved pipe portion 230 from FIGS. 3-5 may be used in combination as desired. In various embodiments, a combination of conduit assembly 600 and conduit assembly 200 may allow for a reduced size heat exchanger 104 in FIGS. 2A and 2B relative to typical heat exchangers as a result of conduit assembly 200 and/or conduit assembly 600 acting as a heat exchanger. In various embodiments, conduit assembly 200, conduit assembly 600, and/or any combination thereof may eliminate a heat exchanger 104 in FIGS. 2A and 2B when enough heat transfer is provided by the conduit assembly.

Figure 7:
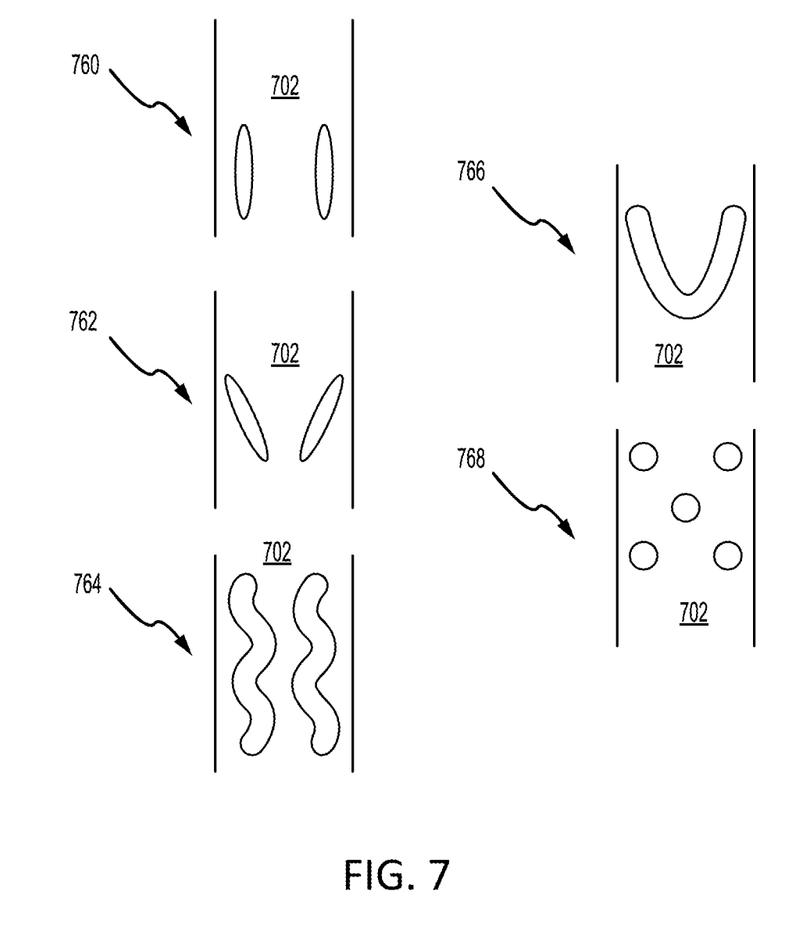
FIG. 7 illustrates a top view of various cooling features formable on a heat transfer surface of a conduit assembly, in accordance with various embodiments.

Referring now to FIG. 7, exemplary trip strip geometries are shown for a heat transfer surface 702 of a conduit assembly (e.g., conduit assembly 200 or conduit assembly 600) according to various embodiments. The heat transfer surface 702 may be an internal surface of a conduit assembly or an external surface of the conduit assembly based on the application. The trip strips may be positioned on any surface internal to a conduit assembly (e.g., conduit assembly 200 or conduit assembly 600), for example. A trip strip 760, 762, 764, 766, 768 may protrude from an internal surface of conduit assembly 200 of straight pipe portion 210, curved pipe portion 230, straight pipe portion 220 and/or any flow guide in the plurality of flow guides 240. Similarly, the trip strip 760, 762, 764, 766, 768 may protrude from an internal surface of conduit assembly 600. In this regard, the trip strip 760, 762, 764, 766, 768 may enhance a heat transfer coefficient within the conduit assembly (e.g., conduit assembly 200, 600) relative to typical conduit assemblies.

In various embodiments, elongated trip strip 760 may be parallel to one another and have similar dimensions. Elongated trip strip 762 may also protrude from any internal surface of a respective conduit assembly (e.g., conduit assembly 200, 600). Elongated trip strip 762 may be angled relative to one another such that the trip strips are non-parallel. Elongated trip strip 762 may also have similar dimensions.

In various embodiments, s-shaped trip strips 764 may protrude from any internal surface of a respective conduit assembly (e.g., conduit assembly 200, 600). S-shaped trip strips 764 may have an undulating geometry similar to a sine wave, for example. S-shaped trip strips 764 may be formed in pairs having similar geometry and dimensions. S-shaped trip strips 764 may also be oriented individually. Chevron trip strip 766 may also protrude from any internal surface of a respective conduit assembly (e.g., conduit assembly 200, 600). Chevron trip strips 766 may have a v shape and may be oriented with the point of the v shape directed generally upstream or downstream. Pedestal trip strips 768 may protrude from any internal surface of a respective conduit assembly (e.g., conduit assembly 200, 600). Pedestal trip strips may be formed having varied or similar geometries and dimensions. Pedestal trip strips may also have varying pitch density Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:
1. A conduit assembly, comprising:
  a pipe defined by an annular wall of constant diameter and configured to receive a first fluid, comprising a first straight pipe portion, a second straight pipe portion, and a curved pipe portion disposed between the first straight pipe portion and the second straight pipe portion;
  a plurality of hollow passages disposed through the pipe; and a plurality of flow guides disposed in the pipe, each flow guide in the plurality of flow guides at least partially defining a respective hollow passage in the plurality of hollow passages, wherein:

the plurality of hollow passages are configured to receive a second fluid, the conduit assembly is configured to transfer heat from the first fluid to the second fluid, the plurality of flow guides comprises a first flow guide and a second flow guide, the first flow guide is disposed through the second straight pipe portion from a first side to a second side, the second flow guide is disposed through the second straight pipe portion from the first side to the second side, and the second flow guide spaced apart vertically from the first flow guide.

2. The conduit assembly of claim 1, wherein the curved pipe portion includes an inner radius portion and an outer radius portion.

3. The conduit assembly of claim 1, wherein the pipe includes a trip strip on a heat-transfer surface.

4. The conduit assembly of claim 1, wherein each of the plurality of flow guides is configured to guide the first fluid.

5. A conduit assembly, comprising:

a pipe defined by an annular wall of constant diameter and configured to receive a first fluid, the pipe including a curved pipe portion having a length of the pipe being curved with a center of curvature outside of the pipe, the pipe including a trip strip on a heat transfer surface;

a plurality of flow guides in the curved pipe portion; and a plurality of hollow passages disposed through the curved pipe portion, the plurality of hollow passages configured to receive a second fluid, the plurality of hollow passages defined by the plurality of flow guides in the curved pipe portion, each of the plurality of hollow passages, extending from an inlet formed through the annular wall in the curved pipe portion to an opposing outlet formed through the annular wall in the curved pipe portion, wherein:

the plurality of flow guides comprises a first flow guide and a second flow guide, the second flow guide is disposed radially outward from the first flow guide relative to the center of curvature, the second flow guide has a second arc length greater than a first arc length of the first flow guide, and the first flow guide and the second flow guide are each configured to turn the first fluid in the conduit assembly through the curved pipe portion of the pipe.

6. The conduit assembly of claim 5, wherein each flow guide in the plurality of flow guides comprises a radially inner wall and a radially outer wall.

7. The conduit assembly of claim 6, wherein the radially inner wall and the radially outer wall at least partially define a respective hollow passage in the plurality of hollow passages.

* * * * *